United States Patent
Brown et al.

(10) Patent No.: US 8,707,297 B2
(45) Date of Patent: Apr. 22, 2014

(54) APPARATUS AND METHODS FOR UPDATING FIRMWARE

(75) Inventors: Michael E. Brown, Pflugerville, TX (US); Matthew L. Domsch, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 1468 days.

(21) Appl. No.: 11/460,197

(22) Filed: Jul. 26, 2006

(65) Prior Publication Data
US 2008/0028385 A1   Jan. 31, 2008

(51) Int. Cl.
G06F 9/445   (2006.01)

(52) U.S. Cl.
USPC .......................................................... 717/178

(58) Field of Classification Search
USPC ........... 717/168–178; 709/220–223; 710/305; 713/1, 2, 400, 182; 700/95; 707/203
See application file for complete search history.

(56) References Cited

U.S. PATENT DOCUMENTS

| | | | |
|---|---|---|---|
| 5,835,761 A | 11/1998 | Ishii et al. | |
| 5,859,911 A | 1/1999 | Angelo et al. | |
| 5,909,592 A | 6/1999 | Shipman | |
| 5,964,873 A | 10/1999 | Choi | |
| 6,138,233 A | 10/2000 | Lim | |
| 6,175,919 B1 | 1/2001 | Ha | |
| 6,237,091 B1 * | 5/2001 | Firooz et al. | 713/1 |
| 6,282,643 B1 | 8/2001 | Cromer et al. | |
| 6,282,647 B1 | 8/2001 | Leung et al. | |
| 6,438,688 B1 | 8/2002 | Nunn | |
| 6,442,754 B1 * | 8/2002 | Curtis | 717/175 |
| 6,581,159 B1 | 6/2003 | Nevis et al. | |
| 6,594,757 B1 | 7/2003 | Martinez | |
| 6,725,178 B2 | 4/2004 | Cheston et al. | |
| 6,732,267 B1 | 5/2004 | Wu et al. | |
| 6,757,838 B1 | 6/2004 | Chaiken et al. | |
| 6,804,773 B1 | 10/2004 | Grigsby et al. | |
| 6,941,452 B2 | 9/2005 | Huang | |
| 6,971,095 B2 | 11/2005 | Hirai et al. | |
| 6,986,034 B2 | 1/2006 | Tyner et al. | |
| 6,990,577 B2 | 1/2006 | Autry | |
| 6,993,650 B2 | 1/2006 | Landers, Jr. et al. | |
| 7,000,101 B2 | 2/2006 | Wu et al. | |
| 7,509,635 B2 * | 3/2009 | Woodhouse | 717/168 |
| 2003/0023966 A1 | 1/2003 | Shimizu et al. | |
| 2003/0055919 A1 * | 3/2003 | Fong et al. | 709/220 |
| 2003/0217357 A1 * | 11/2003 | Parry | 717/168 |

(Continued)

FOREIGN PATENT DOCUMENTS

| | | |
|---|---|---|
| GB | 02375411 A | 11/2002 |
| GB | 02379761 A | 3/2003 |
| WO | WO 0241147 A1 | 5/2002 |

*Primary Examiner* — Tuan A Vu
(74) *Attorney, Agent, or Firm* — Baker Botts L.L.P.

(57) ABSTRACT

A method for updating firmware comprises executing a native operating system change management program that acts cooperatively with a firmware update package to update a firmware program in the information handling system. An apparatus comprises an information handling system running an operating system. An operating system change management program in a memory of the information handling system acts cooperatively with the operating system and a firmware update package to update a firmware program in the information handling system. Another method for updating firmware comprises building a firmware update package that is executable in a change management program running in a native operating system on an information handling system, and storing the firmware update package in a repository available to a user.

18 Claims, 4 Drawing Sheets

(56) References Cited

U.S. PATENT DOCUMENTS

| | | |
|---|---|---|
| 2004/0024917 A1 | 2/2004 | Kennedy et al. |
| 2004/0093597 A1* | 5/2004 | Rao et al. .................. 717/171 |
| 2004/0194081 A1* | 9/2004 | Qumei et al. ................ 717/173 |
| 2004/0205329 A1 | 10/2004 | Wu et al. |
| 2004/0215755 A1 | 10/2004 | O'Neill |
| 2004/0230963 A1 | 11/2004 | Rothman et al. |
| 2004/0243992 A1* | 12/2004 | Gustafson et al. ............ 717/168 |
| 2005/0081024 A1 | 4/2005 | Khatri et al. |
| 2005/0086654 A1* | 4/2005 | Sumi et al. .................. 717/171 |
| 2005/0155029 A1 | 7/2005 | Nguyen et al. |
| 2005/0216753 A1 | 9/2005 | Dailey et al. |
| 2005/0251799 A1 | 11/2005 | Wang |
| 2005/0268296 A1 | 12/2005 | Marolia et al. |
| 2006/0288055 A1* | 12/2006 | Johnson et al. .............. 707/203 |
| 2007/0150886 A1* | 6/2007 | Shapiro ...................... 717/174 |

* cited by examiner

APPARATUS AND METHODS FOR UPDATING FIRMWARE

BACKGROUND

1. Technical Field

This disclosure relates to information handling systems.

2. Background Information

As the value and use of information continues to increase, individuals and businesses seek additional ways to process and store information. One option available is an information handling system (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking system.

SUMMARY

The following presents a general summary of several aspects of the disclosure in order to provide a basic understanding of at least some facets of the disclosure. This summary is not an extensive overview of the disclosure. It is not intended to identify key or critical elements of the disclosure or to limit the scope of the claims. The following summary merely presents some concepts of the disclosure in a general form as a prelude to the more detailed description that follows.

In one aspect, a method for updating firmware comprises executing a native operating system change management program that acts cooperatively with a firmware update package to update a firmware program in the information handling system.

In another aspect, an apparatus comprises an information handling system running an operating system. An operating system change management program in a memory of the information handling system acts cooperatively with the operating system and a firmware update package to update a firmware program in the information handling system.

In yet another aspect, a method for updating firmware comprises building a firmware update package that is executable in a change management program running in a native operating system on an information handling system, and storing the firmware update package in a repository available to a user.

BRIEF DESCRIPTION OF THE DRAWINGS

For detailed understanding of the illustrative embodiments, reference should be made to the following detailed description, taken in conjunction with the accompanying drawings, in which like elements have been given like numerals, wherein.

DETAILED DESCRIPTION

For purposes of this disclosure an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may comprise a personal computer, a network storage device, a network server, or any other suitable device and may vary in size, shape, performance, functionality, and price. The information handling system may include random access memory (RAM), one or more processing resources such as a central processing unit (CPU) or hardware or software control logic, ROM, and/or other types of non-volatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

When electrical power is applied to the IHS, a system start-up initialization program is automatically activated. The start-up initialization program, which may include a basic input output system (BIOS) program, may test the IHS hardware and connectivity, perform runtime services, and load operating program that allows the IHS to perform needed tasks. The term BIOS was originally used by personal computer vendors to refer to a start up initialization program. The term has also become common for identifying start-up initialization program firmware used in other hardware devices such as network servers, Still other classes of computers use such generic terms as "boot monitor", "boot loader" or "boot ROM" to refer to the start up initialization program. Examples of a start-up initialization program include, but are not limited to: PC BIOS; Extensible Firmware Interface (EFI) BIOS; and Open Firmware. The term start-up initialization program is used herein to include all such start up initialization programs. Additionally, firmware may also be resident in the IHS for controlling and/or communicating with, for example, hard drives, network circuitry, and other peripheral devices. As used in this disclosure, a firmware program, also called a firmware image, includes any software embedded in an IHS device used to perform predefined tasks. For the purposes of this disclosure, the term "firmware" includes, but is not limited to, a start-up initialization program. Firmware is commonly stored in non-volatile memory. Non-volatile memory, as used herein, includes any memory device that does not lose stored data upon the loss of power.

The start-up initialization program may also direct the loading of the operating system (OS). As used herein, the OS is a software program, or set of programs that manages the hardware and software resources of a processor-controlled electronic device, inclusive of, but not limited to: a computer, a motherboard, a server, a peripheral, I/O devices, and any other IHS component, or combination of components. A running OS performs basic tasks, such as controlling and allocating memory, prioritizing the processing of instructions, controlling input and output devices, facilitating networking, and managing files. Common operating systems include, but are not limited to, LINUX, UNIX, and WINDOWS, It is intended that any suitable operating system may be used in the several aspects of the present disclosure.

There are many occasions on which it is desirable to update portions of the IHS firmware As a non-limiting example, the system start-up initialization program may be updated to repair software programming errors, commonly known as "bugs" In addition, updates may take advantage of new start-up initialization program features that become available after a previous release, or to enable the start-up initialization program to support new system hardware. Updates to firmware used for non-start-up routines may require updating for reasons similar to those stated above for start-up initialization program.

On PC-based systems, firmware upgrades are often provided using more rudimentary disk operating system (DOS) based utility programs. Such upgrades may require using a DOS environment to access the DOS-based utility programs.

Figure 1:
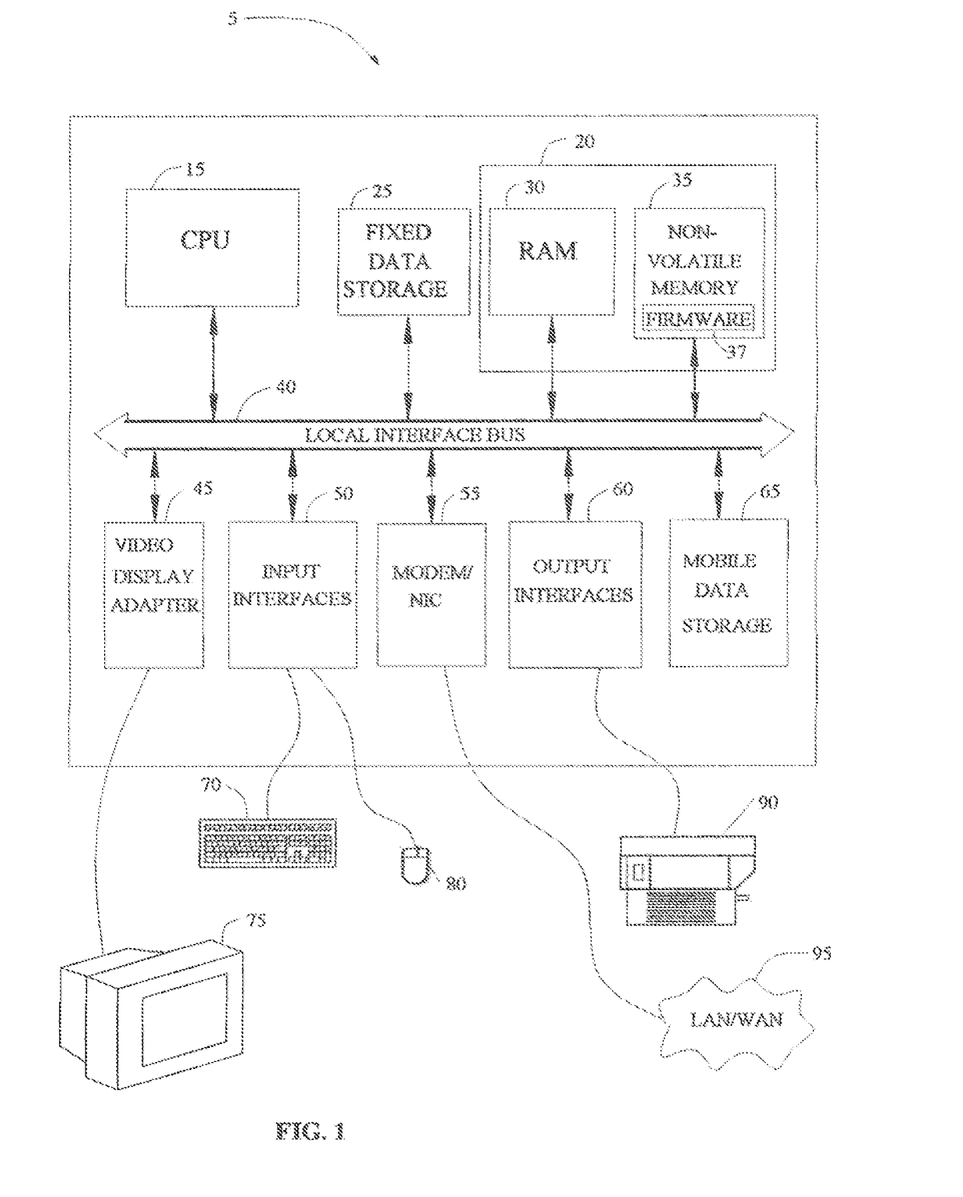
FIG. 1 is a schematic diagram depicting a non-limiting example of an information handling system.

Referring to FIG. 1, in a non-limiting example, an information handling system 5, according to one aspect, comprises a CPU 15. CPU 15 may be a processor, microprocessor, minicomputer, or any other suitable device, for executing programmed instructions. CPU 15 may comprise a plurality of such processors, microprocessors, minicomputers: and other devices. CPU 15 may be in data communication over local interface bus 40 with fixed data storage 25 and memory 20.

Memory 20 comprises non-volatile memory 35 having a firmware program 37, such as an initialization start-up program, stored therein. Non-volatile memory includes, but is not limited to flash memory and electrically erasable programmable read-only memory (EEPROM).The firmware program 37 may contain, for example, all the programming instructions required to control, for example, a keyboard 70, a display monitor 75, a mouse 80, a mobile data storage 65, other input/output devices not shown here, and a number of miscellaneous functions and/or devices. Memory 20 may also comprise a random access memory (RAM) 30. The OS and application programs may be loaded into RAM 30 for execution. RAM 30 may be volatile memory such that data in RAM 30 is typically lost when power is removed.

Fixed data storage device 25 may be used to store the OS, application programs and other data for use by IHS 5. A fixed data storage device refers to non-volatile storage devices including permanent and/or semi-permanent storage devices. Fixed data storage devices may include but are not limited to, a hard disk drive (HDD) and a magnetic tape drive. In addition, a mobile data storage device 65 may interface with local interface bus 40 for transferring data to and/or from IHS 5. Examples of mobile data storage include, but are not limited to, an external portable hard drive, a solid state semiconductor storage device, such as flash memory; and an optical disc storage device, such as a compact disc (CD) and/or a DVD.

IHS 5 may further comprise a video display adapter 45, a plurality of input interfaces 50, a modem/network interface card (NIC) 55, and a plurality of output interfaces 60. Output interface 60 may transmit data to printer 90 for printing, IHS 5 may be coupled to an external network 95 through NIC 55 thus allowing the IHS 5 to send and receive data via the external network 95 to and from a remote device. As shown, the external network 95 may be a local area network (LAN), a wide area network (WAN), including the internet, or any other similar network, As described in FIG. 1, IHS 5 may operate as a personal computer, a network storage device, a network server, or any other enabled information handling device.

Figure 2:
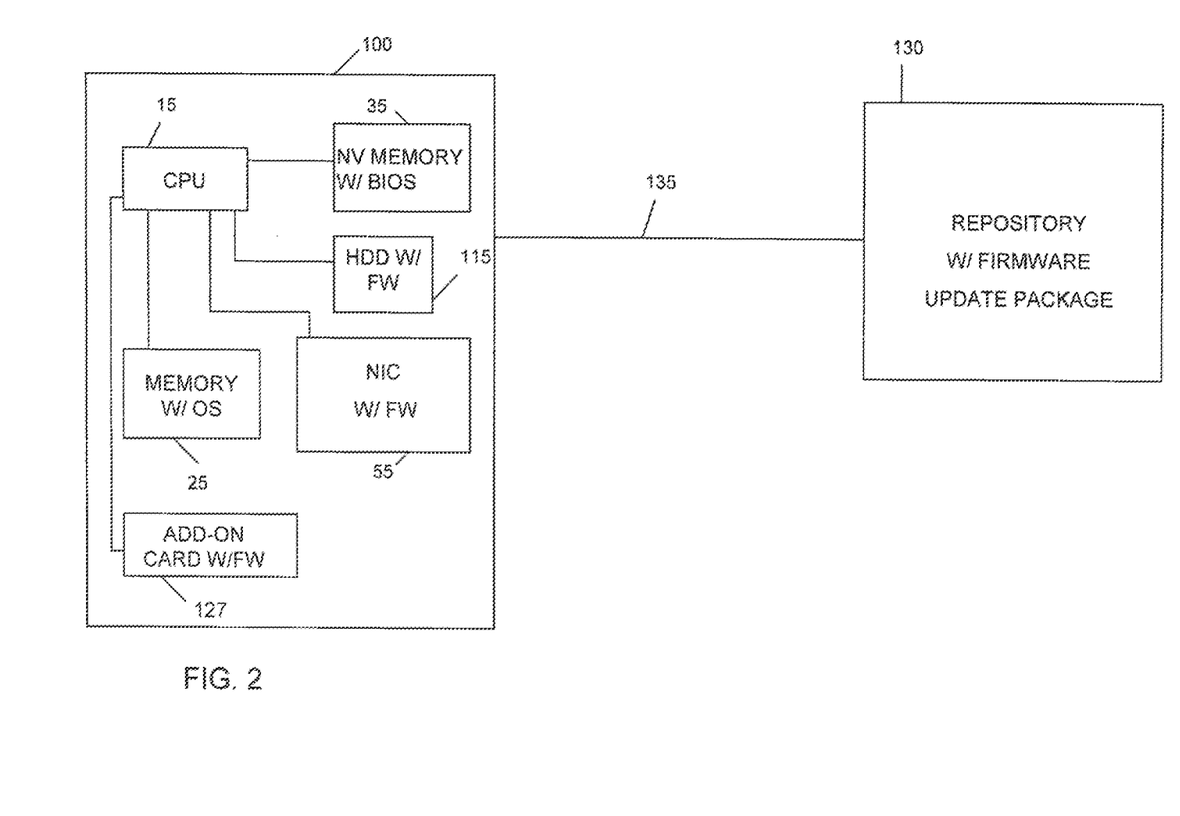
FIG. 2 is a schematic diagram depicting a non-limiting example of an information handling system and a remote update repository.

In another aspect, referring to FIG. 2, a non-limiting example of an information handling system 100 comprises central processing unit 15. CPU 15 is in data communication with memory 35 having a firmware program, such as a start-up initialization program, stored therein. Memory 35 comprises a non-volatile memory as described previously. Hard disk drive 115 provides fixed data storage for an OS and for application programs and other data. CPU 15 is also in data communication with HDD 115 and network interface controller 55. HDD 115 and NIC 55 also may each have firmware stored in nonvolatile memory for controlling each respective device. IHS 100 may further include an add-on card 127 with resident firmware. The add-on card 127 may be in data communication with CPU 15. Add-on card 127 may provide, as non-limiting examples, video display control and output interface control. Another non-limiting example of an add-on card may be a RAID (redundant array of independent disks) card. A RAID card controls data storage among multiple storage devices, such as hard disks. Examples of RAID data storage include, but are not limited to (a) providing more fault tolerant data storage by storing data redundantly across multiple disks (b) providing increased performance by sharing data across multiple disks, or (c) some combination of (a) and (b).

Memory 25 is also in data communication with CPU 15 and may store at least a portion of the OS used to operate IHS 100. The OS may be stored on HDD 115. At least a portion of the OS may be loaded from HDD 115 into memory 25 by the start-up initialization program during system startup.

In one non-limiting examples IHS 100 communicates over network 135 with software/firmware program repository 130. Repository 130 may reside in a separate IHS, a server, or any other suitable file handling system having updates retrievably stored therein. Repository 130 may comprise multiple repositories accessible over the network. Network 135 may be a LAN/WAN, including the internet, and may utilize any type of connection suitable for data communication including, but not limited to, land line, radio frequency connection, satellite link, and microwave link.

In another aspect, the present disclosure provides a system to update firmware programs in IHS 100 using substantially the same type of procedure and using substantially the same software change management utility programs used to update the existing running, also known as native, OS. in one non-limiting embodiment, the change management programs are resident in IHS 100.

Software change management systems typically comprise package management systems to facilitate upgrades. A package management system comprises a collection of software utility programs (tools) used to automate the process of installing, upgrading, configuring, and removing software packages from a computer. In such a system, software is distributed in packages, for example in a single file. Such packages often include the software upgrade and other important information, such as file name, version, and vendor name. A list of other software packages, called dependencies, may also be included. The dependencies are may be required for the software update to run properly. For example, a particular version of one program may be required to properly update another program on an IHS. Non-limiting examples of package management systems for an IHS using LINUX as an OS include, but are not limited to, RPM Package Manager, the GENTOO package manager, and the DEBIAN package manager. A non-limiting example of a package manager for an IHS running WINDOWS as an OS is MICROSOFT Installer (MSI). It is intended that the present disclosure encompass all such package managers and their associated software utility programs for all suitable operating systems, as well as future developed package management systems.

A package manager is a program designed to build and manage packages of software including a source program and/or a binary program. A package manager can be run on different types of IHS systems including, for example, a microcomputer, a workstation, a network server, and a minicomputer. An update package may include the compiled programs and/or libraries needed to update, document, install, verify, and uninstall, each file in the package. In addition, an update package may verify a digital certificate, or other authentication signature for each file in the package. The update package also may include a list of software packages that the update package depends on, called dependencies, and a list of services that are provided by the update package. For example, using RPM Package Manager as a non-limiting example, package files may be of the file form *.rpm. Update packages may be stored in a database such as repository 130, see FIG. 2. The OS package manager of an IHS may periodically query such a repository for software updates.

Using a package manager, in one embodiment, firmware update images and the associated update utility programs may each be packaged as separate update packages using techniques associated with the particular package manager. Any dependency relationship existing between the firmware image packages and the software programs needed to install them may be included as data in each update package. Update functions, including, but not limited to, a firmware inventory function, a version comparison function and a firmware upgrade functions may be incorporated in one, or more, utility programs. Other software utility programs may be included as required. Update and other software utility programs may be separately downloaded and updated from the firmware updates. The size of the update packages may be reduced using this method because the update utility programs do not need to be copied to each of the update packages using that set of utility programs. For example, for multi-system firmware programs, where the installer program is applicable to multiple system types, the Installer program Is not duplicated for each system type, but made available once, for use by each of the firmware update packages.

In another embodiment, a firmware installer program is created for each OS type. The firmware installer program executes in a running OS environment. When executed, OS firmware installer recognizes an update package and proceeds to install the image into the system nonvolatile memory. The firmware update has a dependency on the installer program. To satisfy this dependency, the firmware update package may include a data structure indicating the dependency. For example, the firmware update package may include a data structure having a 'Requires:' string. The 'Requires:' string identifies the dependencies of the firmware update package to ensure a given version of the OS installer program is available to install it.

The firmware update package may further include a data structure such as, for example, a 'Provides:' string. The 'provides:' string identifies, among other things, the new firmware version and the vendor ID of the firmware for which that update is intended. An update package may be tied to one or more System IDs that identify multiple products requiring the same update package. In one non-limiting embodiment, the firmware update package has a 'Provides:' string of the form: system_bios(vendor_$vendor_system_$system)=$version', where $vendor is the PCI SIG (Peripheral Component Interconnect Special interest Group) defined Vendor ID, $system is a vendor unique system identifier, and $version is the version string of a start-up initialization program firmware image update. Additional data files may be included in the update package, as needed.

Figure 4:
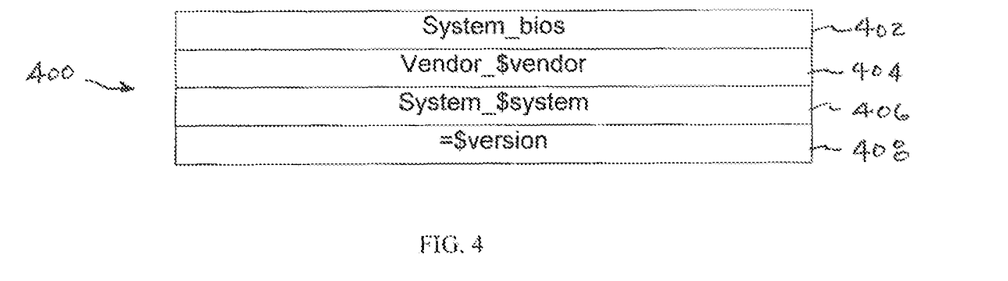
FIG. 4 is a diagram of a data structure for use in one embodiment of the present disclosure.

FIG. 4 is a non-limiting example of a data structure used during the process of updating a firmware program. The "provides" data structure 400 shown in FIG. 4 has four entries according to one illustrative embodiment. The "provides" data structure is created during the building of a firmware update package. A 'system_bios' entry 402 contains data representing the type of firmware program to be updated. A 'vendor_$vendor' entry 404 contains data representing the particular vendor of the firmware to be updated. This data may be in the form of the Peripheral Component Interface Special Interest Group vendor identification number. A 'system_$system' entry 406 contains data representing a vendor system identifier. A '=$version' entry 408 contains data representing the version of the update software contained in the firmware update program.

In yet another embodiment, similar packaging may be used for add-on card firmware. In this case, the industry-standard PCI ID of the card may be included in a 'Provides:' string to identify the vendor and the version of the add-on card firmware.

In even another embodiment, the firmware update packages may be stored in a repository, such as repository 130, see FIG. 2, that may be accessible via the internet and/or an intranet. Repository 130 may be maintained and be made available for remote access by the OS update management programs of users requiring updates. For example, change management software on an IHS, such as the OS package manager, can search through associated online repositories for a firmware update package (and a software dependency) that apply to the hardware of that specific IHS. Multiple repositories may be accessed for different firmware update packages. Repositories may be mirrored to multiple sites. Alternatively, a computer readable medium may have a repository of firmware updates stored thereon and be distributed to customers for such update activity. Such a computer readable medium may include, but is not limited to: CD. DVD, magnetic tape, flash memory, ROM, RAM, and diskette. In one non-limiting example, such a computer readable medium repository may reside in IHS 5.

In one non-limiting example, an OS firmware inventory program is generated, installed and run on IHS 100 to identify firmware on the system and on associated add-on cards and devices needing updates. This information includes, but is not limited to, firmware image name, version, vendor ID, and latest update date. In addition, the firmware may be used to identify any dependency on other packages to identify, for example, whether the correct version of the OS installer executable program is available on the system to install the firmware update. The change management software keeps track of all changes and updates the firmware inventory when firmware updates are available. As new devices and/or add-on cards are installed in IHS 100, the firmware inventory program may need to be run to create a list of added devices, so that the corresponding firmware update packages may be installed on IHS 100.

After a firmware update package is downloaded to the IRS, the running OS change management system may take over and manage the upgrades of the firmware package in a manner substantially the same as that used for OS software updates. This includes, but is not limited to, updating the firmware without requiring a restart of the information handling system, or an additional execution of the start-up initialization program.

Figure 3:
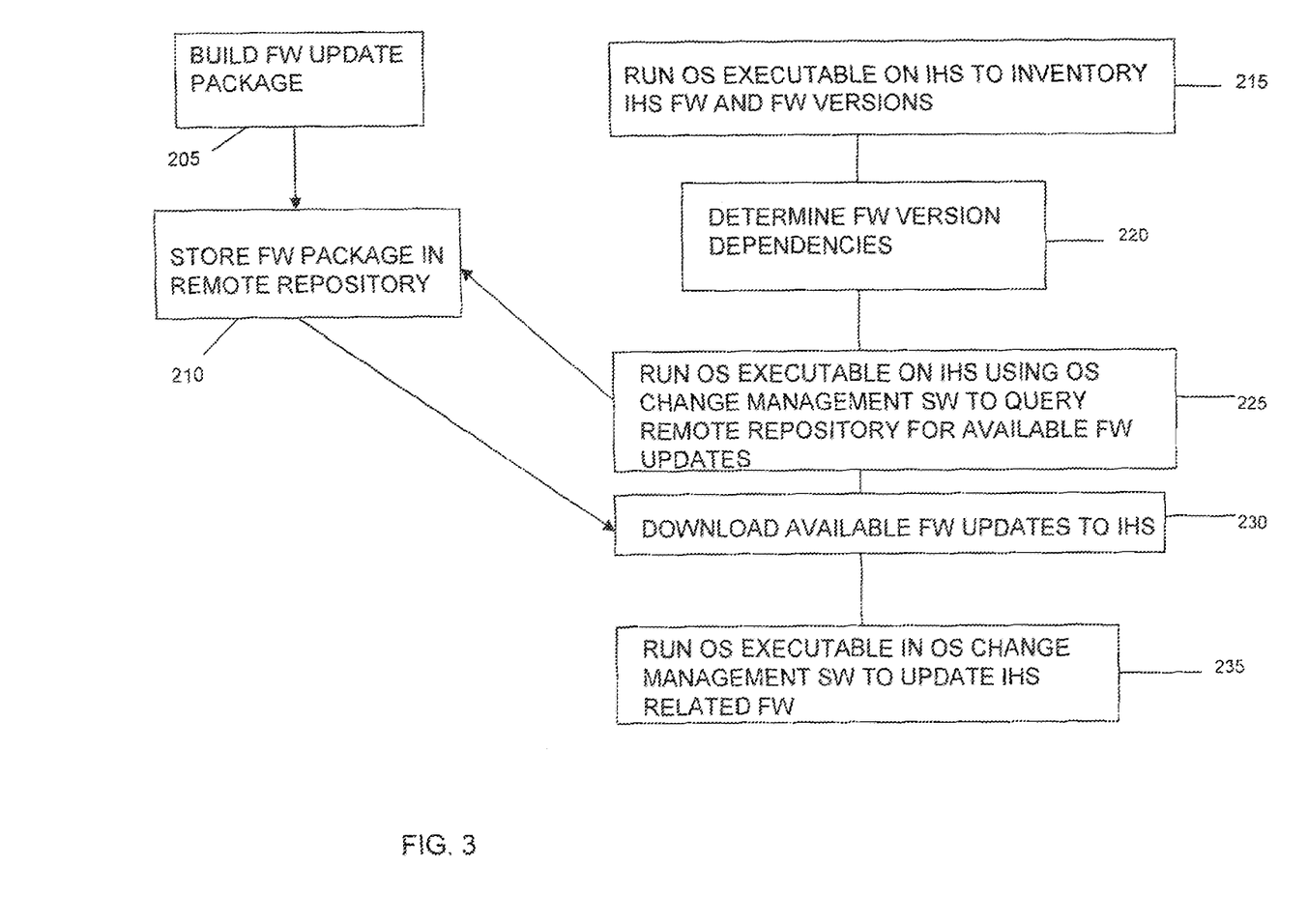
FIG. 3 is a schematic diagram depicting a non-limiting example of a firmware update flow chart according to an illustrative embodiment.

FIG. 3 shows a schematic representation of a non-limiting example of one embodiment of a firmware update scheme, where a firmware update package is generated in block 205. The firmware update package is stored in an update repository in block 210. An OS executable program is run on an IRS to inventory IHS firmware and firmware versions in block 215. Firmware version dependencies are determined in block 220. In block 225, an OS executable program is run on the IHS using the running OS change management software and the firmware inventory and version information, along with the dependency information, to query the remote repository for available firmware updates. Available firmware updates are downloaded from the repository to the IHS in block 230. Once the firmware updates are downloaded, an OS executable program is run using the OS change management software to update the IHS related firmware in block 235. IHS related firmware includes, but is not limited to, start-up initialization program firmware, IHS hardware firmware, and add-on card firmware. IHS hardware firmware may comprise hard disk firmware, network controller firmware, power system firmware, and any other firmware in the IHS.

It is intended that the present disclosure cover all suitable operating systems and their associated package management systems and formats. The concepts disclosed herein are intended to encompass LINUX, UNIX, and WINDOWS operating systems as well any other suitable operating system. A non-limiting WINDOWS operating system example of a package manager includes WINDOWS Server Update service (WSUS) that provides for multiple packages, multiple repositories, and interdependencies.

In another embodiment, the present disclosure may be embodied as a set of instructions on a computer readable medium comprising ROM, RAM, CD, DVD, hard drive, flash memory device, or any other computer readable medium, now known or unknown, that when executed causes an information handling system, for example IHS 100, to implement a method of the present disclosure.

In one illustrative embodiment: a computer readable medium contains a set of executable instructions that when executed by IHS 100 performs a method updating a firmware program in IHS 100. The method comprises executing a program in the operating system environment that acts cooperatively with a firmware update package to update a firmware program in the information handling system.

The computer readable medium may further comprise a second set of executable instructions that when executed by IHS 100 determine a firmware inventory of the information handling system, The computer readable medium may further comprise a third set of executable instructions that when executed by IHS 100 query a repository to identify a firmware update package related to the firmware inventory;

While various embodiments have been shown and described, various modifications and substitutions may be made thereto without departing from the scope of the disclosure. Accordingly, it is to be understood that the examples of this disclosure have been presented by way of illustrations and not limitation.

What is claimed is:

1. A method for installing firmware on a hardware subsystem of an information handling system (IHS) using a package management system, the method comprising:
   executing at least a portion of a first operating system (OS);
   executing a firmware inventory program on the first OS to:
      perform a firmware inventory on the IHS to identify firmware installed on the IHS and to identify firmware versions respectively associated with the firmware, wherein a firmware is executable code embedded in the hardware subsystem, and wherein the firmware inventory includes dependencies of firmware updates of the firmware versions on a version of the package management system;
   executing, from the package management system, a first utility program on the first OS to:
      query a remote repository for firmware packages corresponding to the firmware updates identified in the firmware inventory, wherein the remote repository stores firmware packages compatible with installer programs for a plurality of OSs including the first OS, wherein a firmware package includes at least one firmware update and at least one firmware update tool, and wherein a firmware package includes a field specifying at least one dependency specifying a required version of the package management system; and
      responsive to the querying, download, from the remote repository to an IHS storage, a first firmware package corresponding to the first OS, wherein the first firmware package corresponds to the hardware subsystem of the IHS; and
   executing, from the package management system, a second utility program on the first OS to:
      using a firmware update and a firmware update tool included in the first firmware package, create a firmware installer that is executable on the first OS; and
      upon verifying that the required version of the package management system corresponds to the package management system, use the package management system to execute the firmware installer on the first OS, wherein the firmware installer updates the firmware for the hardware subsystem of the IHS,
   wherein the remote repository stores firmware packages that include an IHS hardware subsystem identifier.

2. The method of claim 1, wherein the first utility program to query the remote repository includes the first utility program to:
   query the remote repository for firmware packages including an IHS hardware subsystem identifier corresponding to the hardware subsystem of the IHS.

3. The method of claim 1, wherein the firmware inventory identifies a plurality of firmware respectively corresponding to a plurality of hardware subsystems of the IHS, including the hardware subsystem of the IHS, wherein the first firmware package includes firmware updates for the plurality of firmware, and wherein the firmware installer updates the firmware for the plurality of hardware subsystems.

4. The method of claim 1, wherein the firmware installer updates the firmware for the hardware subsystem of the IHS without rebooting the IHS.

5. The method of claim 1, wherein the first firmware package corresponds to a start-up initialization program for the IHS.

6. The method of claim 1, wherein the first OS is one from the group consisting of: a LINUX operating system, a UNIX operating system, and a WINDOWS operating system.

7. An information handling system (IHS), comprising:
a processor having access to memory media, wherein the memory media include processor-executable instructions for installing firmware on a hardware subsystem of the IHS using a package management system, the instructions, when executed by the processor, for causing the processor to:
execute at least a portion of a first operating system (OS);
execute a firmware inventory program executable on the first OS to:
perform a firmware inventory on the IHS to identify firmware installed on the IHS and to identify firmware versions respectively associated with the firmware, wherein a firmware is executable code embedded in the hardware subsystem, and wherein the firmware inventory includes dependencies of firmware updates of the firmware versions on a version of the package management system;
execute a first utility program from the package management system on the first OS to:
query a remote repository for firmware packages corresponding to the firmware updates identified in the firmware inventory, wherein the remote repository stores firmware packages compatible with installer programs for a plurality of OSs including the first OS, wherein a firmware package includes at least one firmware update and at least one firmware update tool, and wherein a firmware package includes a field specifying at least one dependency specifying a required version of the package management system; and
responsive to the querying, download, from the remote repository to an IHS storage, a first firmware package corresponding to the first OS, wherein the first firmware package corresponds to the hardware subsystem of the IHS; and
execute a second utility program from the package management system on the first OS to:
using a firmware update and a firmware update tool included in the first firmware package, create a firmware installer that is executable on the first OS; and
upon verifying that the required version of the package management system corresponds to the package management system, use the package management system to execute the firmware installer on the first OS, wherein the firmware installer updates the firmware for the hardware subsystem of the IHS,
wherein the remote repository stores firmware packages that include an IHS hardware subsystem identifier.

8. The IHS of claim 7, wherein the first utility program to query the remote repository includes the first utility program to:
query the remote repository for firmware packages including an IHS hardware subsystem identifier corresponding to the hardware subsystem of the IHS.

9. The IHS of claim 7, wherein the firmware inventory identifies a plurality of firmware respectively corresponding to a plurality of hardware subsystems of the IHS, including the hardware subsystem of the IHS, wherein the first firmware package includes firmware updates for the plurality of firmware, and wherein the firmware installer updates the firmware for the plurality of hardware subsystems.

10. The IHS of claim 7, wherein the firmware installer updates the firmware for the hardware subsystem of the IHS without rebooting the IHS.

11. The IHS of claim 7, wherein the first firmware package corresponds to a start-up initialization program for the IHS.

12. The IHS of claim 7, wherein the first OS is one from the group consisting of: a LINUX operating system, a UNIX operating system, and a WINDOWS operating system.

13. An article of manufacture comprising a non-transitory computer-readable medium storing instructions, that, when executed by a processor, cause the processor to:
execute at least a portion of a first operating system (OS);
execute a firmware inventory program executable on the first OS to:
perform a firmware inventory on the IHS to identify firmware installed on the IHS and to identify firmware versions respectively associated with the firmware, wherein a firmware is executable code embedded in the hardware subsystem, and wherein the firmware inventory includes dependencies of firmware updates of the firmware versions on a version of the package management system;
execute a first utility program from the package management system on the first OS to:
query a remote repository for firmware packages corresponding to the firmware updates identified in the firmware inventory, wherein the remote repository stores firmware packages compatible with installer programs for a plurality of OSs including the first OS, wherein a firmware package includes at least one firmware update and at least one firmware update tool, and wherein a firmware package includes a field specifying at least one dependency specifying a required version of the package management system; and
responsive to the querying, download, from the remote repository to an IHS storage, a first firmware package corresponding to the first OS, wherein the first firmware package corresponds to the hardware subsystem of the IHS; and
execute a second utility program from the package management system on the first OS to:
using a firmware update and a firmware update tool included in the first firmware package, create a firmware installer that is executable on the first OS; and
upon verifying that the required version of the package management system corresponds to the package management system, use the package management system to execute the firmware installer on the first OS, wherein the firmware installer updates the firmware for the hardware subsystem of the IHS,
wherein the remote repository stores firmware packages that include an IHS hardware subsystem identifier.

14. The article of manufacture of claim 13, wherein the first utility program to query the remote repository includes the first utility program to:
query the remote repository for firmware packages including an IHS hardware subsystem identifier corresponding to the hardware subsystem of the IHS.

15. The article of manufacture of claim 13, wherein the firmware inventory identifies a plurality of firmware respectively corresponding to a plurality of hardware subsystems of the IHS, including the hardware subsystem of the IHS, wherein the first firmware package includes firmware updates for the plurality of firmware, and wherein the firmware installer updates the firmware for the plurality of hardware subsystems.

16. The article of manufacture of claim 13, wherein the firmware installer updates the firmware for the hardware subsystem of the IHS without rebooting the IHS.

17. The article of manufacture of claim 13, wherein the first firmware package corresponds to a start-up initialization program for the IHS.

18. The article of manufacture of claim 13, wherein the first OS is one from the group consisting of: a LINUX operating system, a UNIX operating system, and a WINDOWS operating system.

* * * * *